United States Patent
Zhang et al.

(10) Patent No.: US 7,818,390 B2
(45) Date of Patent: Oct. 19, 2010

(54) METHOD FOR TRANSFERRING DATA BETWEEN TERMINAL APPARATUSES IN A TRANSPARENT COMPUTATION SYSTEM

(75) Inventors: Yaoxue Zhang, Beijing (CN); Guangbin Xu, Beijing (CN); Wenyuan Kuang, Beijing (CN); Yuezhi Zhou, Beijing (CN)

(73) Assignee: Tsinghua University, Beijing (CN)

( * ) Notice: Subject to any disclaimer, the term of this patent is extended or adjusted under 35 U.S.C. 154(b) by 576 days.

(21) Appl. No.: 11/744,098

(22) Filed: May 3, 2007

(65) Prior Publication Data

US 2007/0271239 A1   Nov. 22, 2007

(30) Foreign Application Priority Data

May 18, 2006   (CN)   .................. 2006 1 0084757

(51) Int. Cl.
    *G06F 15/16* (2006.01)
(52) U.S. Cl. .................. 709/215; 711/173; 711/148
(58) Field of Classification Search .................. 709/218; 711/173, 148
    See application file for complete search history.

(56) References Cited

U.S. PATENT DOCUMENTS

| | | | | |
|---|---|---|---|---|
| 5,987,506 A * | 11/1999 | Carter et al. | ................ | 709/213 |
| 6,253,300 B1 * | 6/2001 | Lawrence et al. | ............ | 711/173 |
| 6,385,721 B1 * | 5/2002 | Puckette | ......................... | 713/2 |
| 6,952,737 B1 * | 10/2005 | Coates et al. | ............... | 709/229 |
| 7,111,161 B2 * | 9/2006 | Sugita et al. | .................... | 713/2 |
| 7,127,602 B1 * | 10/2006 | Bakke et al. | ................ | 709/222 |
| 7,136,903 B1 * | 11/2006 | Phillips et al. | .............. | 709/217 |
| 7,197,608 B2 * | 3/2007 | Mikuma et al. | ............. | 711/151 |
| 7,363,514 B1 * | 4/2008 | Behren | .......................... | 713/2 |
| 2002/0038296 A1* | 3/2002 | Margolus et al. | ............... | 707/1 |
| 2002/0152262 A1* | 10/2002 | Arkin et al. | .................. | 709/202 |
| 2003/0046366 A1* | 3/2003 | Pardikar et al. | ............. | 709/219 |
| 2003/0126242 A1* | 7/2003 | Chang | ......................... | 709/222 |
| 2004/0128361 A1* | 7/2004 | Gaffney | ....................... | 709/217 |
| 2004/0139098 A1* | 7/2004 | Margolus et al. | ............ | 707/100 |
| 2006/0075063 A1* | 4/2006 | Grosse et al. | ............... | 709/217 |
| 2006/0212740 A1* | 9/2006 | Jackson | ......................... | 714/4 |
| 2007/0016680 A1* | 1/2007 | Burd et al. | .................. | 709/227 |
| 2007/0033132 A1* | 2/2007 | Defries | ......................... | 705/37 |
| 2009/0198805 A1* | 8/2009 | Ben-Shaul et al. | .......... | 709/222 |

OTHER PUBLICATIONS

Talia, D.; Trunfio, P., "Toward a synergy between P2P and grids," Internet Computing, IEEE, vol. 7, No. 4, pp. 96-95, Jul.-Aug. 2003.*

* cited by examiner

*Primary Examiner*—Ajay Bhatia
(74) *Attorney, Agent, or Firm*—Workman Nydegger

(57) ABSTRACT

A method for transferring data between terminal apparatuses in a network at least comprising a server, a first terminal apparatus and a second terminal apparatus, wherein the server has a storage device at least comprising a first and a second disk images; the method comprising: generating a message of data transfer request based on the information on the data to be transferred; transferring the generated message to the second terminal apparatus; receiving the message and transferring the message to the server if the requested data transfer is allowed; and transferring date between the first disk image and the second disk image, in response to the reception of the message.

4 Claims, 2 Drawing Sheets

METHOD FOR TRANSFERRING DATA BETWEEN TERMINAL APPARATUSES IN A TRANSPARENT COMPUTATION SYSTEM

TECHNICAL FIELD

The present invention relates to a method for transferring data between terminal apparatuses in a network, and more particularly, to a method for transferring data between terminal apparatuses having local computation capability, especially having no hard disk, in a computer system, which is based on transparent computation mode, on a computer network.

BACKGROUND ART

In current computation modes such as pervasive computation or network computation, for any and every computer, it is necessary to develop and install respective operating system, supporting tools and application software for the computer, otherwise the computer cannot perform respective application computations or run respective software systems. This results in continuously heightening requirement on the configuration of PC (for example, memory, hard disk, frequency and speed of CPU, and so on), and continuous complication and bulkiness of software operating system. For mobile devices (e.g., PDA, mobile phone and the like) and digital home appliances (e.g., ISDN telephone and the like) in which only mini-imbedded operating system can be installed, and small software can be run, however, there is a problem that they are very difficult to be interconnected and intercommunicated with a general computer network system, such as Internet. The one-to-one correspondence between hardware system and software system and the successive upgrades of the hardware system make the software system more and more complicated, and its use and maintenance costs ever higher. Meanwhile, continuously obsolete computer devices form further more rubbish and cause further environmental pollution.

As stated in a reference paper "Transparent Computation: Concept, Structure and Examples, Zhang Yao Xue, Electronics Journal, Vol 32, No. 12A, Dec., 2005", a transparent computation is a computation mode in which a user needs not to recognize locations of a computer operating system, supporting tools and application programs, and can find relevant computation services from various devices by request (including various fixed, mobile devices and household appliances); and these services are computation modes stored on a server located on a distributed network.

Transparent computation mode comprises servers and clients (terminal apparatuses), hardware systems of which are similar to conventional servers/clients. They differ from conventional servers/clients in that in the transparent computation mode, the clients may be various different terminal apparatuses, for example, desktop PC, network computer NC, PDA, etc. This mode is characterized in that: (I) no operating system, supporting tool or application program is pre-installed on the clients, and if necessary, required system software, tools and application programs may be downloaded automatically from a server to be executed in client environments; (II) a user may optionally select, on the client, any operating system and tools and application programs that can be run on the client hardware without making any substantial modification on the application programs, thus the operability and compatibility of the application programs can be guaranteed; (III) virtual exchange and scheduling are performed via the network, thus the resources sharing and execution performance can be improved; and (IV) all of the application computations are done on the client side, not on the server side.

The Network Interconnection Laboratory of Tsing Hua University has proposed a transparent computation based computation system (referring to the relevant China patent application No. 200510063064.7), in which terminal apparatuses have local computational capability, have the same function and performance as ordinary PC, can resolve the problem of heavy dependency of computation on the server in conventional network computer systems, and have dedicated network protocol as well as virus-proof and self-recovering mechanisms of a file system; in addition, a user may optionally select to run Windows, Linux or other operating systems on the terminal apparatus. The existing transparent computation based systems are mainly adapted for the application computation in local area network environment, now they are widely used in electronic office works, multimedia classroom and other application fields, and obtain good effects.

In a transparent computation mode based system, through a virtual disk mechanism, a user may use a terminal apparatus having no hard disk as if it is a common PC, and each of terminal apparatuses has its respective private virtual disks 12A and 12B. The virtual disks function similarly to that of the local disk of PC, and may be arbitrarily read and written by the user of respective terminal apparatus. The virtual disks of terminal apparatus do not physically exist, but correspond, respectively, to disk image areas 18A, 18B in the disk system of the server; therefore, in fact, the user data are all stored in the disk of the server. In fact, as shown in FIG. 3, what is seen locally by the user of terminal apparatus is a view 30 of virtual disks 31A and 31B constituted by a system partition (C:) and a data partition (E:), these two partitions can be read and written arbitrarily by the user, thus the operations and results of operations performed on the terminal apparatus by the user can be stored after shutdown. The disk images 18A and 18B of the storage space 32 of the server corresponds to the virtual disks of the terminal apparatuses, and substantially consist of three types of partitions on the server, that is, a shared partition 33 shared by all the terminal apparatuses sharing the same operating system image, hiding partitions 34A, 34B and private partitions 35A and 35B dedicated to respective terminal apparatuses. In these partitions, the shared partition and one hiding partition altogether correspond to the system partition on a terminal apparatus; the hiding partition can be arbitrarily read and written by the terminal apparatus, and records the modification on the system partition made by the user of the terminal apparatus; but the shared partition can be only read by the terminal apparatuses. For example, a user performs adding, deleting or modifying operations on the system partition; these operations are recorded in the corresponding hiding partition, and the results of operations are stored in the hiding partition as well. For example, if a file is modified or added, the new file is also stored in the hiding partition. The combination of the contents of the hiding partition and the shared partition forms the system partition of the terminal apparatus, but the contents of the former are of higher priority when the system partition is read by the terminal apparatus, thus it is guaranteed that the system partition seen by the user on the terminal apparatus is always in its most recently updated state. The data partition is a partition on the terminal apparatus mainly for storing user data, which is usually larger than the hiding partition. The data partitions are in one-to-one correspondence with the private partitions on the server, that is, one private partition on the server is the data partition of one terminal apparatus, which can be arbitrarily read and written. The above-mentioned specific read and write procedure performed by the terminal apparatus on the server's disk image belong to an internal mechanism of transparent computation, and are transparent to users, what is seen by them is only a local readable and writable hard disk comprising a system partition and a data partition, therefore, the above mentioned mechanism is referred to as transparent read-write mechanism operating under the file system.

According to different implementations, the server may interact with terminal apparatuses in data sharing units of files, sectors or self-defining blocks. The server may directly operate the data sharing units in the disk image. For example, in an implementation that is based on a file as a data sharing unit, the files in the disk image are visible to the server, therefore, may by directly operated by the server. As a usual logical organization scheme of data in computer systems, files are usually taken as units for transferring data between different computers connected via a network in practical applications. In existing implementations of transparent computation that are based on a file as a data sharing unit, this is practically implemented as copying files, which are taken as units, between the system partitions (embodied as hiding partitions on the server) and/or data partitions (embodied as private partitions on the server) of different terminal apparatuses on the server, while in the existing implementations of transparent computation based on sectors as data sharing units, this is practically implemented as copying sectors belonging to the same file between the system partitions (embodied as hiding partition on the server) and/or data partitions (embodied as private partitions on the server) of different terminal apparatuses on the server. For the former, if it is required to transfer files between different terminal apparatuses, the terminal apparatuses performing local computations use conventional file transferring and sharing methods, such as FTP, TFTP, NF3 and etc., so as to establish connection between the terminal apparatuses of the origination party and the processing party of the file transfer (read/write) request, to perform file transfer, and to read and write specific file in the memory space of the server by the transparent read-write mechanism, FIG. 1 shows a prior art of transparent computation system based on files as data sharing units, in which a server 19 and a plurality of terminal apparatuses 11A and 11B are located on a local area network. Since all computations occur locally, if at some time, the user on terminal apparatus 11A requests to transfer a file on a local hard disk to a local hard disk of terminal apparatus 11B, for the user, firstly, the terminal apparatus 11A establishes a connection with the terminal apparatus 11B by existing file transfer methods such as FTP and etc, then reads the original file 13 from the virtual disk 12A and transfers it to the virtual disk 12B. In fact, in this implementation, the data of the original file 13 are read from the disk image A corresponding to the virtual disk 12A on the server and transferred to the terminal apparatus 11A (path 14); then the data are transferred to the terminal apparatus 11B from the terminal apparatus 11A via FTP (path 15); finally, the data are transferred to the disk image 18B corresponding to the virtual disk 12B on the server by the terminal apparatus 11B via the local transparent read-write mechanism (path 16), then a copy 13A of the original file is finally generated in the hiding partition (when involving modification of the file in the shared partition) and/or the private partition, thus a single transfer of the file data is completed. Therefore, the transferring of file data actually comprises a transferring procedure of from the server to terminal apparatus 11A, from terminal apparatus 11A to terminal apparatus 11B, and then from the terminal apparatus 11B to the server. It can be seen from the above procedure that in order to perform a single transfer of file data between the terminal apparatuses, the server and both terminal apparatuses sending and receiving file data shall allocate corresponding resources of buffers, processors and I/O devices, and at the same time, corresponding bandwidth resources shall be occupied, especially it is necessary for the server to maintain two transfer paths 14 and 16.

For such implementations, if, in a short time, relatively large number of terminal apparatuses mutually transfer files therebetween, and large number and large size files are transferred, various resources of the server, each of terminal apparatuses, and the network shall be occupied, and operating speeds of the terminal apparatuses and the performance of the whole system will be remarkably reduced. Since both the origin and destination of data transfer are substantially located on the server, therefore the above mentioned problem can be solved by improving the data transfer method and reducing the data transfer path to reduce the occupation of related resources.

SUMMARY OF THE INVENTION

In order to solve the problem of the waste of various resources of a server, terminal apparatuses and a network, and low transfer efficiency due to transferring data through circuitous path during data transfer between terminal apparatuses in transparent computation systems of the prior art, the present invention provides a method for transferring data between terminal apparatuses in a network at least comprising a server, a first terminal apparatus and a second terminal apparatus, wherein the server has a storage device at least comprising a first disk image which can be used by the first terminal apparatus and a second disk image which can be used by the second terminal apparatus; the method comprising:

a step in which the first terminal apparatus, as an originating party of the data transfer request, generates a message of data transfer request based on the information on the data to be transferred;

a step in which the generated message of the data transfer request is transferred to the second terminal apparatus as a receiving party of the data transfer request;

a step in which the second terminal apparatus receives the message and transfers the message to the server if the requested data transfer is allowed; and a step in which the server performs data transfer between the first disk image and the second disk image, in response to the reception of the message.

In one embodiment of the present invention, the terminal apparatuses have no readable and writable involatile storage device; each of the first disk image and the second disk image comprises a read only shared partition, a readable and writable hiding partition and a private partition, wherein the shared partition is shared by the first disk image and the second disk image, and a modification of the shared partition is stored in the hiding partition of respective disk image.

In one embodiment of the present invention, after the server performs data transfer between the first disk image and the second disk image, the server transmits to the second terminal apparatus a message indicating the completion of the data transfer operation; and the second terminal apparatus transmits to the first terminal apparatus a message indicating the completion of the data transfer operation.

In one embodiment of the present invention, the message of data transfer request at least comprises the fields of:

a identifier of the originating party of the data transfer request, a identifier of the receiving party of the data transfer request, a data transfer type indicating data reception or transmission, and identification information of the data to be transferred.

In one embodiment of the present invention, the second terminal apparatus sends a transfer rejection message to the first terminal apparatus, if the requested data transfer is not allowed by the second terminal apparatus; and in response to the reception of the message of data transfer request, the second terminal apparatus fills a identifier of the originating party of the data transfer request into the field of the identifier of the originating party of the data transfer request in the message of data transfer request, if the requested data transfer is allowed.

In one embodiment of the present invention, the data to be transferred is one or more files; and the field of the identification information of the data to be transferred in the message of data transfer request comprises the sub-fields of:

a filename of the file;

a size of the file;

a store address of the file in the first image;

a modification time of the file; and a store address of the file in the second disk image.

In one embodiment of the present invention, the server determines whether the message of data transfer request is valid or not after receiving the message; if determining that the message of data transfer request is valid, the server determines whether the transferred file is to be written into the system partition of the receiving party or the originating party, based on the data transfer type, the store address of the file in the first disk image and the store address of the file in the second disk image; if determining that the file is to be written into the system partition, the server determines whether the shared partition or hiding partition of the destination disk image contains the same file; if determining that none of the partitions has the same file, the file is copied into the respective hiding partition; and the transferred file to be written into the data partition of the receiving party or the originating party is copied into the private partition of the destination disk image.

In one embodiment of the present invention, the data to be transferred is the data in one or more consecutive sectors; and the field of the identification information of the data to be transferred in the message of data transfer request comprises the fields of:

a number of a first sector in the consecutive sectors, and the number of the consecutive sectors.

In one embodiment of the present invention, before the generation of the message of data transfer request, if the originating party of the data transfer request determines that the total number of the files to be transferred is greater than a predetermined threshold, or the sizes of the all the files to be transferred are greater than another preset threshold, the originating party generates respective data transfer request message, otherwise transfers the files by the use of a conventional method such as FTP, etc.

In one embodiment of the present invention, before the generation of the message of data transfer request, the probability that the originating party of the data transfer request generates the message of data transfer request is in positive exponential relationship with the total number or the total size of the files to be transferred; if the originating party does not generate the message of data transfer request, it transfers the files by the use of a conventional method such as FTP, etc.

For the terminal apparatuses using the transparent computation of the data transfer method of the present invention, only interaction of control type messages is required to be performed between each of the terminal apparatuses and the server, in order to transfer data between the terminal apparatuses; the real data transfers are implemented by local copying performed by the server, therefore the efficiency of data transfer as well as the overall performance of the transparent computation system can be improved.

DETAILED DESCRIPTION

The following is a detailed description of embodiments of the present invention with reference to the drawings.

Figure 1:
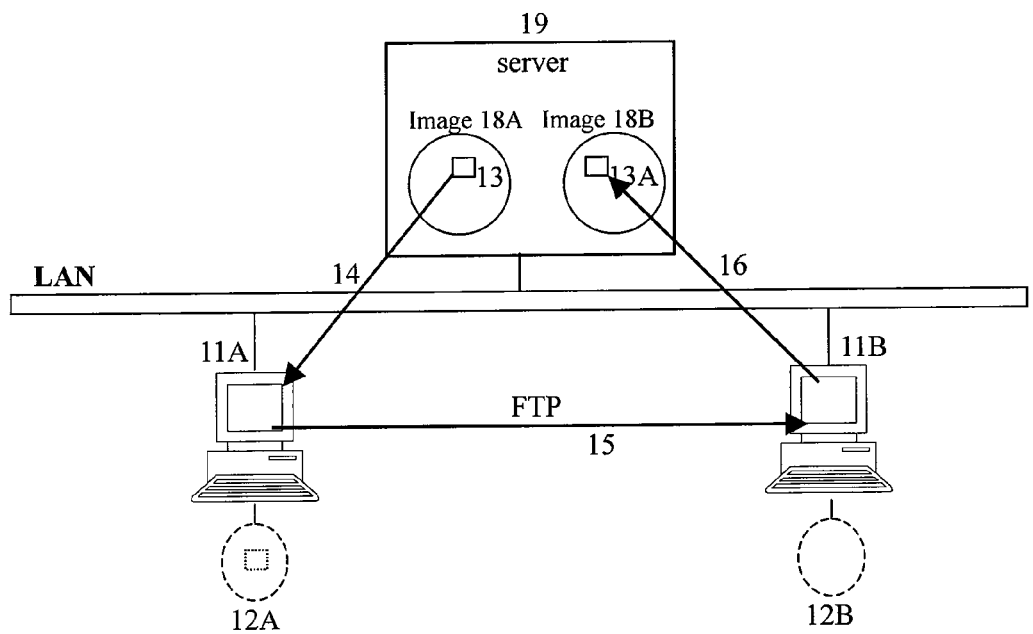
FIG. 1 is a schematic drawing showing the file data transfer between terminal apparatuses in the transparent computation system of the prior art.
Figure 2:
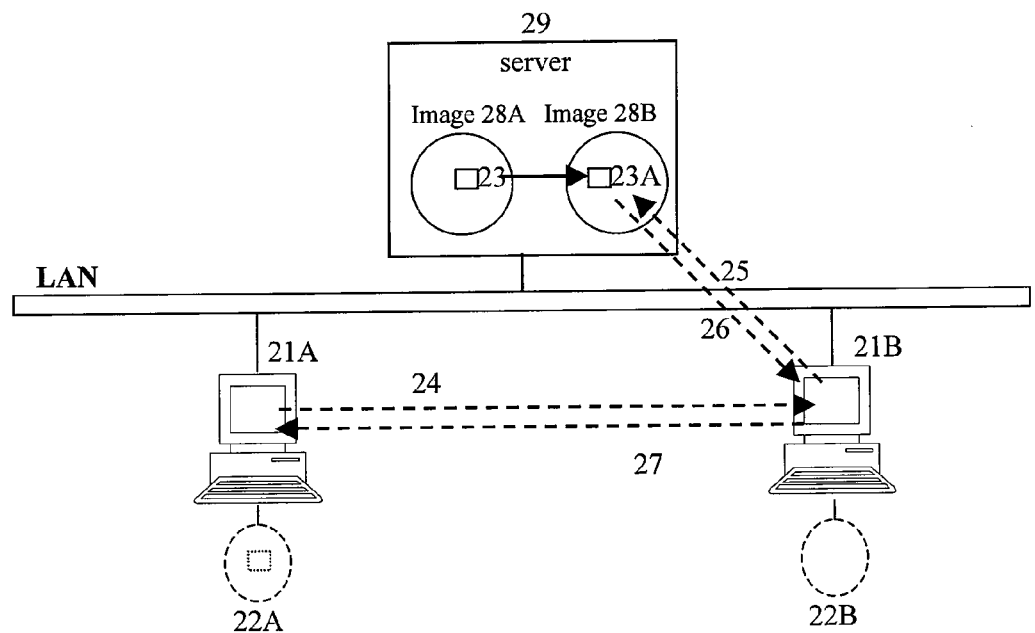
FIG. 2 is a schematic drawing showing the file data transfer between terminal apparatuses in the transparent computation system in accordance with the present invention.
Figure 3:
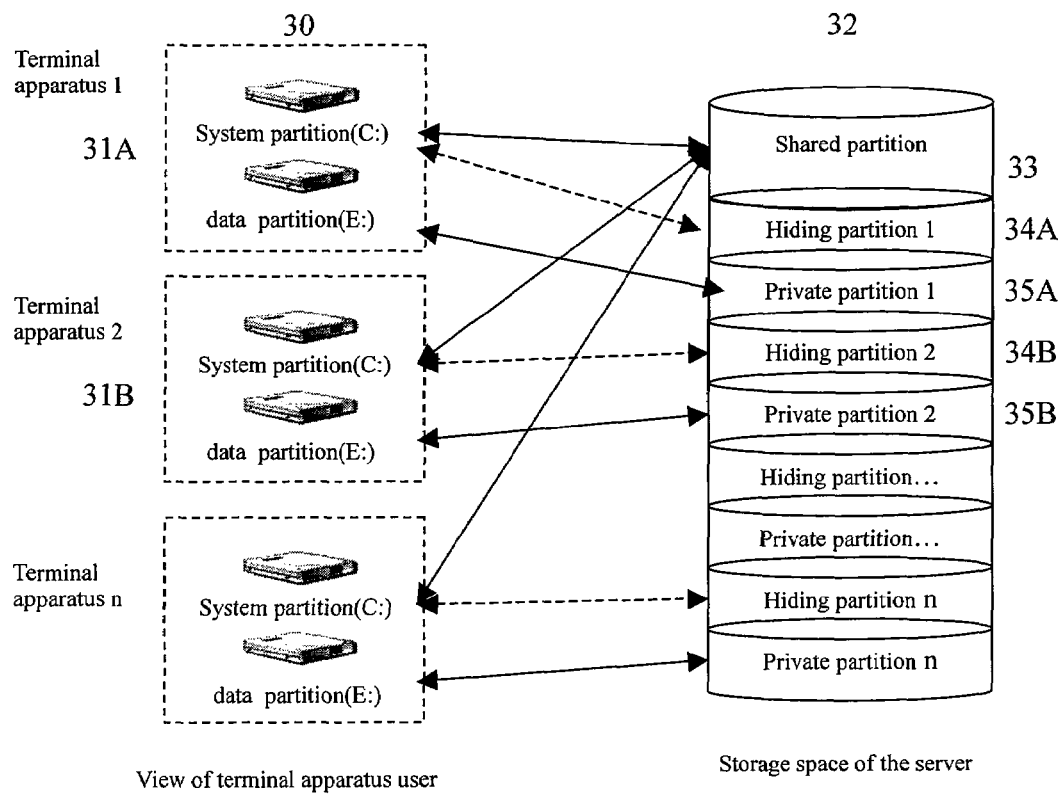
FIG. 3 is a schematic drawing showing virtual disk mechanism in the transparent computation system.

FIG. 2 is a schematic drawing showing a network in which files are transferred between transparent computation terminal apparatuses by use of the method of the present invention. As shown in FIG. 2, a server 29 and a plurality of terminal apparatuses 21A, 21B are located on a local area network (LAN). After being powered up, the terminal apparatus download required operating system, according to the selection of the user, to complete its start-up. During normal operation, each of the terminal apparatuses appears to the user to have its local "hard disk", which may be arbitrarily accessed by the user; stored data thereon still exist when the terminal apparatus is restarted, thus the hard disk is just like one provided on PC. However, no real hard disk is provided on the terminal apparatus, and the "hard disks" showing to the user on the terminal apparatus are virtual disks 22A, 22B. As mentioned above, through the virtual disk mechanism of transparent computation, each virtual disk corresponds to a storage space on the server disk system (e.g., IDE, SCSI and etc.), which are referred to as disk images (image A, image B), and each of them comprises a shared partition 33, a hiding partition 34A and a private partition 35A. All the data stored on the virtual disks are practically stored in corresponding partitions of respective disk image on the server.

If a terminal apparatus 21A is to transfer one or more files in its own virtual disk 22A to the virtual disk 22B of another terminal apparatus 21B, or to transfer one or more file in the virtual disk 22B of the terminal apparatus 21B to it own virtual disk 22A, then the former is referred to as the originating party of a file transfer request, while the latter is referred to as the receiving party of a file transfer request. The transfer procedure between the originating party, receiving party of the file transfer request and the server is controlled by use of a control message referred to as a file transfer request. A file transfer request is a link list, which comprises one or more nodes as composed in Table 1. One node corresponds to one file in which it includes at least following fields:

TABLE 1

| ID_req | ID_resp | Op_type | Filename | File_size | Add_req | Add_resp | Re_time |
|--------|---------|---------|----------|-----------|---------|----------|---------|

Where:
ID_req is a identifier of originating party of the file transfer request;
ID_resp is a identifier of the receiving/processing party of the file transfer request;
OP_type indicates that the file transfer request is a read (download) request or a write (upload) request;
Filename is a name (identifier) of the file to be transferred;
File_size is a size of the file to be transferred
Add_req is a store address of the file to be transferred in the virtual disk of the originating party of the file transfer request;
Add_resp is a store address of the file to be transferred in the virtual disk of the receiving party of the file transfer request;
Re_time is a last modification time of the file to be transferred.

Therefore, a file transfer request may include a request for transferring of one or more files.

If a user needs to transfer a file between two terminal apparatuses at a certain time, the originating party of the file transfer request generates a message of file transfer request, fills related information in sequence into the message of file transfer request based on the information on the file to be transferred, and sets the ID_resp field to be null.

After completion of the above mentioned steps, the originating party of the file transfer request transmits the message of file transfer request to the receiving party of the file transfer request (24). If the receiving party of the file transfer request agrees to perform file transfer, it fills its own identifier into the ID_resp field of the message of file transfer request, while if the ID_resp fields of all the nodes in the message of file transfer request are null, it means no file is allowed to be transferred, thus a transfer rejection information is returned directly to the originating party of the file transfer request, otherwise, the processed message is sent to the server (25).

If it is determined by the server that the received message of the file transfer request is correct and each of the fields is reasonable and not null, then corresponding local disk operations are performed according to the content of the Op_type field; copying of files is performed between the disk images 28A and 28B corresponding to the originating party and receiving party of the file transfer request, respectively. More specifically, it is determined whether the transferred file needs to be written into the system partition of the receiving party or originating party, according to the Op_type, Add_req and Add_Resp fields; and it is determined whether the system partition of the destination contains the same file, according to comparison of the attributes of the files (e.g., filename, size and modification time). The file is copied to respective hiding partition only when no same file is in the system partition, otherwise no practical copying is performed, thus copying of same file into the hiding partition can be reduced; and the transferred files that need to be written into the data partition are directly copied into respective private partitions. The above mentioned operations performed by the server in file copying replace the functions of the transparent read-write mechanism performed on the terminal apparatus, thus the workload of the terminal apparatus in mutually transferring file data can be further reduced.

After the successful completion of the above mentioned steps, the server returns to the receiving party of the file transfer request a message indicating the successful completion of the operation (26), comprising information about the read or written files. The receiving party updates the status of the locally maintained file according to the information, and, at this time, the system partition and data partition of the virtual disk of the receiving party show to the user the updated status. Then, the receiving party of the file transfer request returns to the originating party of the file transfer request a message indicating the completion of transferring (27), comprising the information on the read or written files. The receiving party updates the status of the locally maintained file according to the information, and, at this time, the system partition and data partition of the virtual disk of the originating party show to the user the updated status.

The above description does not recite error processing and reliability and safety of the message transferring in the present embodiment in detail, because they are irrelevant to the substantive contents of the present invention. Those skilled in the art may understand the related knowledge with reference to the error processing mechanism, reliable transfer mechanism and safety mechanism of file read/write and network transmission of the prior art.

In another embodiment, before the originating party of the file transfer request generates the message of file transfer request, it may first determine the number of files to be transferred and the size of each of the files; in the case that the number of files to be transferred is greater than a predetermined threshold, the originating party generates a file transfer request corresponding to these files, and transfers these files by the use of the above mentioned method; otherwise, if the size of a file to be transferred exceeds a preset threshold, the originating party generates a file transfer request corresponding to these "large" files, and transfers these large files by the use of the above mentioned method, while those files having sizes not exceeding the preset threshold are transferred by the use of conventional methods such as FTP or the like.

In another embodiment, before the originating party of the file transfer request generates the message of file transfer request, it may determine whether the above mentioned method is to be used for transferring files according to a probability-based scheme. For example, by the use of the probability in positive exponential relation ship with the total number of the files to be transferred or the size of each of files to be transferred, it can be determined whether the file to be transferred is transferred by the use of the above mentioned method. In this situation, if the determination is negative, the transfer is performed by the use of the conventional methods such as FTP and the like.

In the transparent computation, the server usually consists of a common low cost PC, therefore, the above mentioned two embodiments reduce, to a certain degree, the probability of the sudden drop of the performance caused by the necessity for a common PC to perform concentrated disk operations in short time interval.

Each of the methods described above can also be similarly applied to the embodiments of various transparent computation systems in which data sharing units are based on sectors, self defined blocks or other forms.

The following description takes, as an example, an embodiment in which a data sharing unit is based on sectors. In this system, the sector is the logical interacting unit of the disk data between the terminal apparatus and server. The terminal apparatus is responsible for maintaining the status of the local virtual disk, that is, the terminal apparatus maintains respective sector mapping table to realize the mapping of the sectors in the virtual disk onto the sectors in respective disk image on the server, which functions under a file system. Therefore, even if what is seen or operated on the terminal apparatus by the user is a file, it is also converted into sectors in the virtual disk by the file system and virtual disk drive of the terminal apparatus, and the operation is further converted to the operation on sectors in respective disk image on the server corresponding to the file via the sector mapping table. In the procedure of mapping the local sectors onto the server disk image in the sector-based embodiment, the above mentioned transparent read/write mechanism is used, that is, the determination is based on the sector addresses; if a write sector of the data partition is operated, then the corresponding private partition on the server is directly written; however, if a write sector of the system partition is operated, then it is redirected to the hiding partition. The method for transferring sector data between terminal apparatuses may be similar to the above mentioned method for transferring file data. When a sector data is transferred between transparent computation terminal apparatuses, only interactions of control type messages are necessary to be performed between each of the terminal apparatuses and the server, and the practical data transfer are achieved by the local sector copying of the server.

If it is necessary for a terminal apparatus to transfer data of one or more sectors in its own virtual disk to the virtual disk of another terminal apparatus, or to transfer data of one or more sectors in the virtual disk of another terminal apparatus into its own virtual disk, then the former is referred to as the originating party of the sector transfer request, and the latter is referred to as the receiving party of the sector transfer request. The transfer procedure between the originating party, the receiving party of the sector transfer request and the server is controlled by the control message of the sector transfer request. A sector transfer request is a link list, which includes one or more nodes as composed in Table 2. One node corresponds to a consecutive sector string, i.e., consecutive sectors, and it at least includes following fields:

TABLE 2

| ID_req | ID_resq | Op_type | StartSector | SectorNum |
| --- | --- | --- | --- | --- | where:
ID_req is a identifier of the originating party of the sector transfer request;
ID_resp is a identifier of the receiving/processing party of the sector transfer request;
Op_type indicates that the sector transfer request is read (download) request or a write (upload) request;
StartSector is the number of a first sector of the consecutive sectors to be transferred;
SectorNum is the number of sectors included in the consecutive sectors to be transferred.

If the date of one or more consecutive sectors are to be transferred between two terminal apparatuses at a certain time, the originating party of the sector transfer request generates a message of the sector transfer request, fills the related information into the message of sector transfer request in sequence, according to the information on the sectors to be transferred, and sets the ID_resp field to be null.

After the completion of the above mentioned steps, the originating party of the sector transfer request sends the message of sector transfer request to the receiving party of the sector transfer request. If the receiving party agrees to transfer the data of sectors, it fills its own identifier into the ID_resp field of the message of sector transfer request. If the ID_resp fields of all nodes in the message of sector transfer request are null, it is indicated that no sector data will be transferred, therefore, a transfer rejection message is directly returned to the originating party of the sector transfer request, otherwise the processed message is sent to the server.

The server determines if the received message of the sector transfer request is correct and each of the fields are reasonable and non-null, then local disk operations are performed according to the content of the Op_type field, and copying of sector data is performed between the disk images corresponding to the originating party and receiving party of the sector transfer request.

After the successful completion of the above mentioned steps, the server returns to the receiving party of the sector transfer request a message indicating the successful completion of the operations, including the information on read or written sectors; and the receiving party updates the locally maintained mapping table based on the message. Then, the receiving party of the sector transfer request returns to the originating party of sector transfer request a message indicating the completion of the transferring, including information on the read or written sectors; and the originating party updates the locally maintained mapping table based on the message.

The above description does not recite error processing and reliability and safety of the message transferring in the present embodiment in detail, because they are irrelevant to the substantive contents of the present invention. Those skilled in the art may understand the related knowledge with reference to the error processing mechanism, reliable transfer mechanism and safety mechanism of disk read/write and network transmission of the prior art.

In another embodiment, before the originating party of the sector transfer request generates the message of sector transfer request, it may first determine the number of consecutive sectors to be transferred and the size of each of the consecutive sectors. If the number of consecutive sectors to be transferred is greater than a predetermined threshold, the originating party generates a sector transfer request corresponding to these consecutive sectors to be transferred, and transfers them by the use of the above mentioned method; if the sizes of the consecutive sectors to be transferred exceed a preset threshold, the originating party generates a sector transfer request corresponding to these "long" consecutive sectors, and transfers these consecutive sectors by the use of the above mentioned method, while those consecutive sectors with their sizes not exceeding the preset threshold may be transferred by the use of conventional data transfer methods.

In another embodiment, before the originating party of the sector transfer request generates the message of sector transfer request, it may determine whether data of the sector is transferred by the use of the above mentioned methods, according to a probability based scheme. For example, by the use of the probability in positive exponential relationship with the total number of consecutive sectors and/or the size of each of the consecutive sectors to be transferred, it may be determined whether the above mentioned method is used for transferring data of consecutive sectors to be transferred. In this case, it the determination is negative, conventional data transfer methods may be used for transferring data of the consecutive sectors.

As stated above, in the transparent computation, the server usually consists of a common low cost PC, therefore, the above mentioned two embodiments reduce, to a certain degree, the probability of the sudden drop of the performance caused by the necessity for a common PC to perform concentrated disk operations in short time interval.

The above description recites embodiments of the present invention in which it is used in a transparent computation system that is based on a sector as a data sharing unit. In view of similarity of situations, the description does not recite details of the applications of the present invention in transparent computation systems employing other forms of data sharing units.

The embodiments of the present invention, described in the above, are only illustrative, the technical solutions obtained by various modifications and changes by those skilled in the art without departing from the concept of the present invention will be regarded as within the scope of the present invention. The scope of the present invention will be defined by the claims.

What is claimed is:

1. A method for transferring data between terminal apparatuses in a transparent computation system at least comprising a server, a first terminal apparatus and a second terminal apparatus, wherein said server has a storage device at least comprising a first disk image which can be used by the first terminal apparatus and a second disk image which can be used by the second terminal apparatus; said method comprising:

a step in which the first terminal apparatus, as an originating party of a data transfer request, generates a message of data transfer request based on the information on the data to be transferred, wherein:
said message of data transfer request at least comprises fields of:
an identifier of the originating party of the data transfer request;
an identifier of the receiving party of the data transfer request;
a data transfer type indicating data reception or transmission; and
identification information of the data to be transferred, wherein the identification information of the data to be transferred in said message of the data transfer request comprises sub-fields of:
a filename of the file;
a size of the file;
a store address of the file in the first image;
a modification time of the file; and
a store address of the file in the second disk image; and
the data to be transferred includes one or more files;
a step in which the generated message is transferred to the second terminal apparatus as a receiving party of the data transfer request;
a step in which the second terminal apparatus receives said message and transfers said message to said server if the requested data transfer is allowed; and
a step in which said server performs data transfer between the first disk image and the second disk image, in response to the reception of said message;
a step in which said server transmits to the second terminal apparatus a message indicating the completion of the data transfer operation, and the second terminal apparatus transmits to the first terminal apparatus a message indicating the completion of the data transfer operation;
wherein the terminal apparatuses have no readable and writable involatile storage device; each of the first disk image and the second disk image comprises a read only shared partition, a readable and writable hiding partition and a private partition, wherein the shared partition is shared by the first disk image and the second disk image, and a modification of the shared partition is stored in the hiding partition of the respective disk image;

wherein the second terminal apparatus sends a transfer rejection message to the first terminal apparatus, if the requested data transfer is not allowed by the second terminal apparatus; and in response to the reception of said message of the data transfer request, the second terminal apparatus fills an identifier of the originating party of said data transfer request into the field of the identifier of the originating party of said data transfer request in said message of the data transfer request, if the requested data transfer is allowed; and wherein the server determines whether the message of data transfer request is valid or not after receiving the message; if determining that the message of data transfer request is valid, the server determines whether the transferred file is to be written into the system partition of the receiving party or the originating party, based on the data transfer type, the store address of the file in the first disk image and the store address of the file in the second disk image; if determining that the file is to be written into the system partition, the server determines whether the shared partition or hiding partition of the destination disk image contains the same file; if determining that none of the partitions has the same file, the file is copied into the respective hiding partition; and the transferred file to be written into the data partition of the receiving party or the originating party is copied into the private partition of the destination disk image.

2. The method according to claim 1, wherein the data to be transferred is the data in one or more consecutive sectors; and the field of the identification information of the data to be transferred in the message of data transfer request comprises the fields of:
a number of a first sector in the consecutive sectors, and
the number of the consecutive sectors.

3. The method according to claim 1, wherein, before the generation of the message of data transfer request, if the originating party of the data transfer request determines that the total number of the files to be transferred is greater than a predetermined threshold, or the sizes of the all the files to be transferred are greater than another preset threshold, the originating party generates respective message of the data transfer request, otherwise transfers the files by the use of a conventional method such as FTP, etc.

4. The method according to claim 1, wherein, before the generation of the message of data transfer request, the probability that the originating party of the data transfer request generates the message of data transfer request is in positive exponential relationship with the total number or the total size of the files to be transferred; if the originating party does not generate the message of data transfer request, it transfers the files by the use of a conventional method such as FTP, etc.

* * * * *